United States Patent [19]
Alimpich et al.

[11] Patent Number: 6,054,988
[45] Date of Patent: *Apr. 25, 2000

[54] EXPAND TO WELLS FUNCTION IN GRAPHICAL USER INTERFACE SYSTEM

[75] Inventors: Claudia C. Alimpich; Joan Stagaman Goddard, both of Boulder, Colo.; Minh Trong Vo, Mountain View, Calif.; James Philip Wittig, Boulder; Rachel Youngran Yang, Superior, both of Colo.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/696,744
[22] Filed: Aug. 14, 1996
[51] Int. Cl.[7] ...................................................... G06F 15/00
[52] U.S. Cl. ........................... 345/353; 345/349; 345/356
[58] Field of Search ...................................... 345/340–348, 345/326, 333, 349, 350, 351, 352, 353, 354, 356, 357

[56] References Cited

U.S. PATENT DOCUMENTS 5,714,971   2/1998   Shalit et al. ............................. 345/340

*Primary Examiner*—Ba Huynh
*Attorney, Agent, or Firm*—David W. Victor; Konrad Raynes & Victor LLP

[57] ABSTRACT

A method apparatus and application is provided for displaying wells containing objects related to objects initially displayed. The computer system has at least a visual operator interface, an operating system for operating applications within the computer system, and memory for storing the application. A new display control function called Expand to Wells is provided. The Expand to Wells function opens all the wells for any object on which it is dropped. The function applies to all objects shown. A separate one is not required for each well.

26 Claims, 7 Drawing Sheets

EXPAND TO WELLS FUNCTION IN GRAPHICAL USER INTERFACE SYSTEM

BACKGROUND OF THE INVENTION & STATE OF THE PRIOR ART

1. Field of the Invention

The present invention relates to graphical user interfaces ("GUI"). More particularly, the present invention relates to an Expand to Wells function by which the user of a graphical user interface can easily and conveniently view "windows within windows" or "wells" of objects related to objects displayed in an initial window.

2. Description of Related Art

In order to better understand the terms utilized in this patent application, a brief background definition section will be presented so that the reader will have a common understanding of the terms employed and associated with the present invention.

A "user interface" is a group of techniques and mechanisms that a person employs to interact with an object. The user interface is developed to fit the needs or requirements of the users who use the object. Commonly known user interfaces can include telephone push buttons or dials, or pushbuttons such as on a VCR or a television set remote. With a computer, many interfaces not only to allow the user to communicate with the computer but also allow the computer to communicate with the user. These would include (1) command-line user interfaces (i.e., user remembered commands which he/she enters, e.g. "C:>DIR" in which "DIR" is a typical DOS command entered at the "C" prompt); (2) menu-driven user interfaces which present an organized set of choices for the user, and (3) graphical user interfaces, ("GUI") in which the user points to and interacts with elements of the interface that are visible, for example by a "mouse" controlled arrow or cursor.

An example of a GUI user interface is that which is offered by International Business Machines Corporation (IBM) under the name "Common User Access" ("CUA"). This GUI incorporates elements of object orientation (i.e., the user's focus is on objects and the concept of applications is hidden). Object orientation of the interfaces allow for an interconnection of the working environment in which each element, called an "object," can interact with every other object. The objects users require to perform their tasks and the objects used by the operating environment can work cooperatively in one seamless interface. With objected oriented programming using a GUI, the boundaries that distinguish applications from operating systems are no longer apparent or relevant to the user.

In connection with this patent application, an "object" means any visual component of a user interface that a user can work with as a unit, independent of other items, to perform a task. By way of example, a spreadsheet, one cell in a spreadsheet, a bar chart, one bar in a bar chart, a report, a paragraph in a report, a database, one record in a database, and a printer are all objects. Each object can be represented by one or more graphic images, called "icons," with which a user interacts, much as a user interacts with objects in the real world. (NOTE: In the real world, an object might be an item that a person requires to perform work. As an example, an architect's objects might include a scale, T-square, a sharp pencil etc. while an accountant's objects might include a ledger and a calculator.) However, it is not required that an object always be represented by an icon, and not all interaction is accomplished by way of icons. For example, a user can interact with an object by opening a window that displays more information about the object and includes a variety of mechanisms for interacting with the object.

While classification of objects may follow many different definitions, each class of objects has a primary purpose that separates it from the other classes. A class may be looked at as a group of objects that have similar behavior and information structures. In addition, each of the objects enumerated and defined below may contain other objects. There are three primary classes of objects. Each is discussed below.

(1) Container Object: This object holds other objects. Its principal purpose is to provide the user with a way to hold or group related objects for easy access or retrieval. An operating system, e.g. OS/2® (a trademark of IBM Corporation) or Windows® (a trademark of Microsoft Corporation), typically provides a general-purpose container, for example a folder or a program group—that holds any type of object, including other containers. For example, imagine a program group (or folder) labeled "PRIVATE FOLDER—ICONS". In the program group are three folder icons labeled "REPORTS", "PORTFOLIO" and "LETTERS". By selecting with a mouse or other pointing device the icon "PORTFOLIO", another window may open showing three more icons labeled "OIL PAINTINGS", "WATERCOLORS", and "PORTRAITS". In turn, selecting any of those three icons may open additional windows with further icons representing further subdivisions, or cross-references (e.g. , "CUSTOMERS").

(2) Data Objects: The principal purpose of a data object is to convey information. This information may be textual or graphical information or even audio or video information. For example, a business report displayed on the computer monitor may contain textual information concerning sales of "gadgets" over the past few years (text object) to all customers and also may contain a bar chart (graphic object) to pictorially depict, on the same monitor screen, the sales information.

(3) Device Objects: The principal purpose of a device object is to provide a communication vehicle between the computer and another physical or logical object. Many times the device object represents a physical object in the real world. For example, a mouse object or icon can represent the user's pointing device, and a modem object can represent the user's modem, or a printer object or icon can represent the user's printer. Other device objects are purely logical, e.g. an out-basket icon representing outgoing electronic mail; a wastebasket object or icon representing a way the user may "trash" or dispose of other objects.

As can be seen from the foregoing, a class of objects may be defined as a description of the common characteristics of several objects, or a template or model which represents how the objects contained in the class are structured. While there are further ways in which to define objects and class of objects, typically each class of objects will include similar attributes, the values of which the user will alter, modify, replace or remove from time to time. (For a more complete discussion of objects, attributes, object oriented interfaces etc. see "Object Oriented Interface Design: IBM Common User Access" (published by Que ISBN 1-56529-170-0).

In a graphical use interface, a window frequently contains one or more objects that are related to other objects. The related objects are not initially displayed. To view the related objects the user typically must double-click on the object shown. A window, called a "well," or a "window within a window" then appears containing all of the related objects. A separate window is opened for each well. Alternatively, in other graphical user interfaces, the user must drop a display control function on the object shown. A well then appears containing all of the objects related to the one on which the display control function was dropped. The display control function represents the class of objects that will be displayed in the well. A separate display control is needed for each well, which is confusing and inconvenient for the user.

The two mechanisms known in the art for accessing a well thus are problematic. The double click method requires user precision and can yield a confusing number of overlapping windows if more than one well is pulled up. The display control function mechanism is confusing for the user since a separate display control function is needed for each possible well.

SUMMARY OF THE INVENTION

It is an object of the present invention to provide a convenient and easy to use mechanism for displaying, in a window within a window or well, objects related to a displayed object.

A further object of the invention is to reduce the number of windows needed to display related objects.

Accordingly, a method, apparatus and application is provided for displaying wells containing objects related to objects initially displayed. The computer system has at least a visual operator interface, an operating system for operating applications within the computer system, and memory for storing the application. A new display control function called Expand to Wells is provided. The Expand to Wells function opens all the wells for any object on which it is dropped. The function applies to all objects shown. A separate one is not required for each well.

Other objects of the invention and a more complete understanding of the invention may be had by referring to the following description taken in conjunction with the accompanying drawings.

BRIEF DESCRIPTION OF THE DRAWINGS

FIG. 5, including

DESCRIPTION OF THE ILLUSTRATIVE EMBODIMENTS

Figure 1:
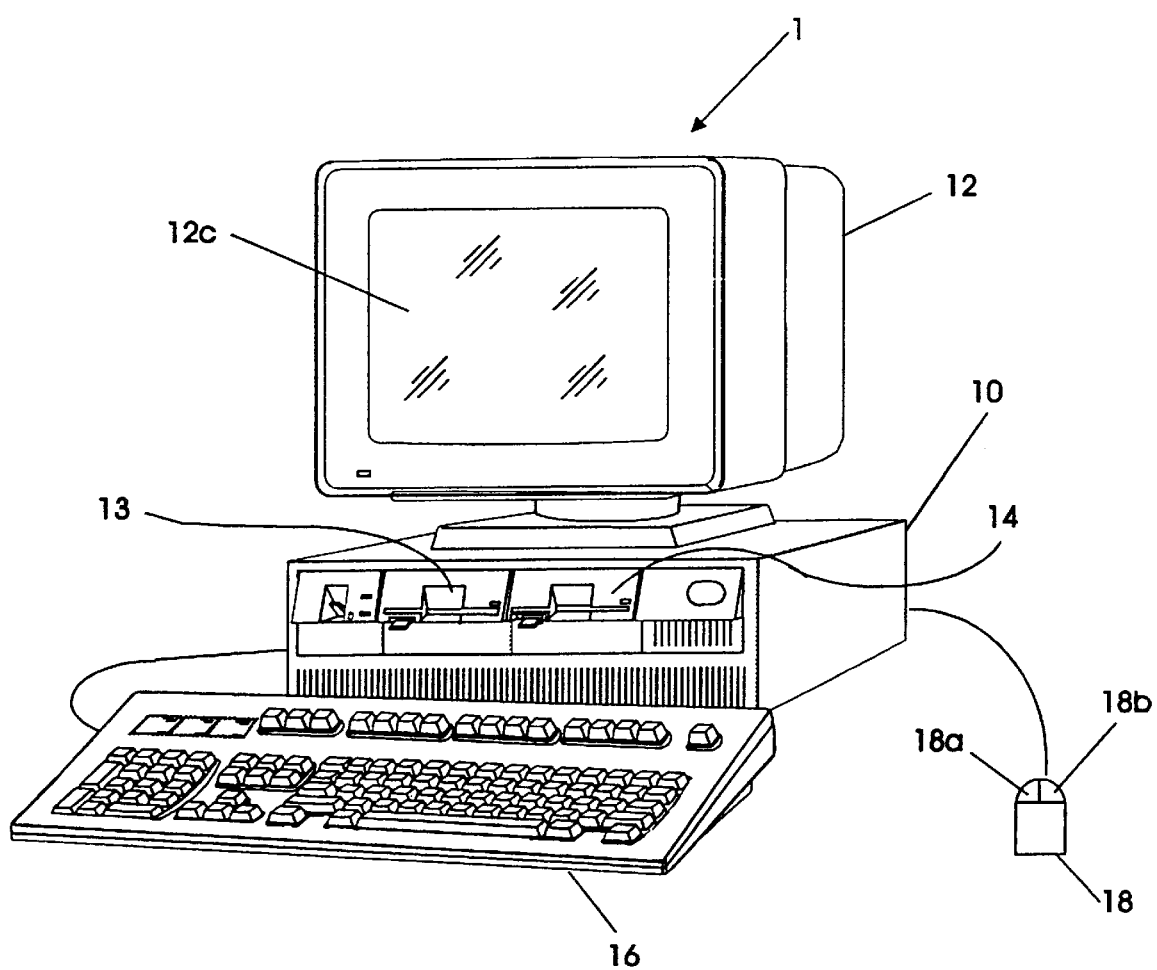
FIG. 1 illustrates a typical desktop computer system which may be employed to practice the novel method and application of the present invention.
Figure 2:
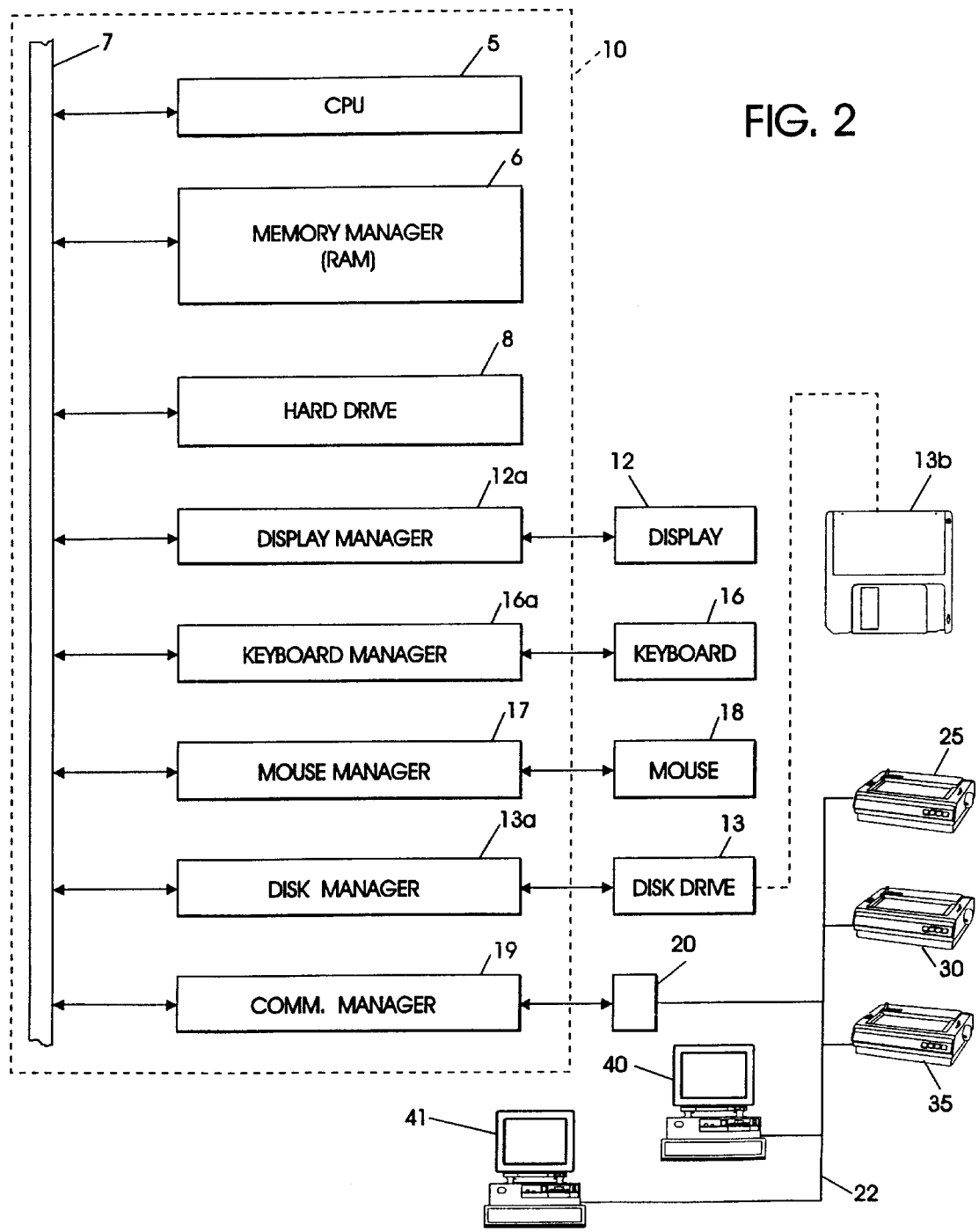
FIG. 2 is a block diagram illustrating a sample configuration of the computer system shown in FIG. 1.

Turning now to the drawings, and especially FIGS. 1 and 2, FIG. 1 diagrammatically shows a computer system 1 which may be connected to a Local Area Network system (LAN 20) as shown in FIG. 2.

As shown in FIG. 1, the computer system 1 comprises a main chassis 10, a display means or monitor 12, a connected keyboard 16 and a pointing device, in the present instance a mouse 18 which is operator controlled to move a pointer cursor 12b (shown in FIG. 3) on the display or monitor screen 12c. As shown in FIG. 2, the chassis 10 includes a central processing unit, or "CPU" 5, a memory manager and associated random access memory, or "RAM" 6, a fixed disk or hard drive 8 (which may include its associated disk controller), a display manager 12a which is connected externally to the chassis 10 of the display 12; a keyboard manager 16a, which through flexible cable (not shown) is connected to the keyboard 16; a mouse manager 17 (which in some instances may form part of the display manager 12a, and may be in the form of a software driver) for reading the motion of the mouse 18 and its control mouse buttons (MB) 18a and 18b, shown in FIG. 1. A disk manager or controller 13a which controls the action of the disk drive 13 (and an optional drive such as a magneto-optical or CD ROM drive 14) shown in FIG. 1, rounds out most of the major elements of the computer system 1.

The pointer element or cursor 12b can be moved over the display screen 12c by movement of the mouse 18. The mouse buttons (MB) 18a and 18b give commands to the operating system (not shown), usually through a software mouse driver provided by the mouse manufacturer. With the first mouse button (MB) 18a the operator can select an element indicated on the display screen 12c using the pointer or cursor 12b, i.e., signify that an action subsequently to be performed is to be carried out on the data represented by the indicated element on the display screen 12c. The operating system normally gives some visual feedback to the operator to indicate that the element has been selected, such as a change in color, or a blocking of the icon. The second mouse button (MB) 18b may be a menu button, if desired. Conventionally, when the operator presses button 18b, a selection menu or dialog with system commands will appear on the display screen 12c. The operator may select an object, icon, or item from the selection menu or input information into the dialog box as appropriate using the cursor 12b and the first mouse button (MB) 18a. Some menu items, if selected, may call up another menu or submenu for the operator to continue the selection process.

The use of a mouse and selection menus is well known in the art, for example U.S. Pat. No. 4,464,652 to Lapson et al. describes a selection menu of the pull-down type in combination with a mouse. It should be recognized, of course, that other cursor pointing devices may be employed, for example a joystick, ball and socket, or cursor keys on the keyboard.

The foregoing devices (and corresponding software drivers) within the chassis 10 communicate with one another via a bus 7. To round out the computer system 1, an operating system (not shown) must be employed. If the computer system is a typical IBM-based system, the operating system may be DOS-based and include a GUI interface such as contained in OS/2®, or WINDOWS®, or other operating system of choice. If the computer system is based upon RISC (reduced instruction set computer) architecture, then the operating system employed may be, in the instance of an IBM-based RISC architectured System/6000®, AIX. Alternatively, if the computer system 1 is a large host computer, such as a an IBM 3090, it may be running an operating system such as MVS or VM. This operating system normally includes a print service facility, such as IBM's PSF, which is a system-wide resource manager, which takes a "job" which has been formatted for a particular printer, and sends certain files, such as fonts, special commands and the like to the printer before sending the file to be printed.

In the illustrated instance, the computer system 1 includes an I/O (Input/Output) manager or communications manager 19 (shown in FIG. 2) which serves to link the computer system for communications with the outside world such as to a systems printer, a modem or a LAN controller (such as a Token ring or ETHERNET or even through a modem employing SDLC) such as shown at 20 in FIG. 2. The LAN controller may be incorporated inside the computer system 1 or located externally as shown diagrammatically in FIG. 2, as desired. The LAN controller 20 may connect to other computer systems 40 and 41 as well as to other printers such as printers 25, 30 and 35 by communications cable 22 and the like.

Figure 3:
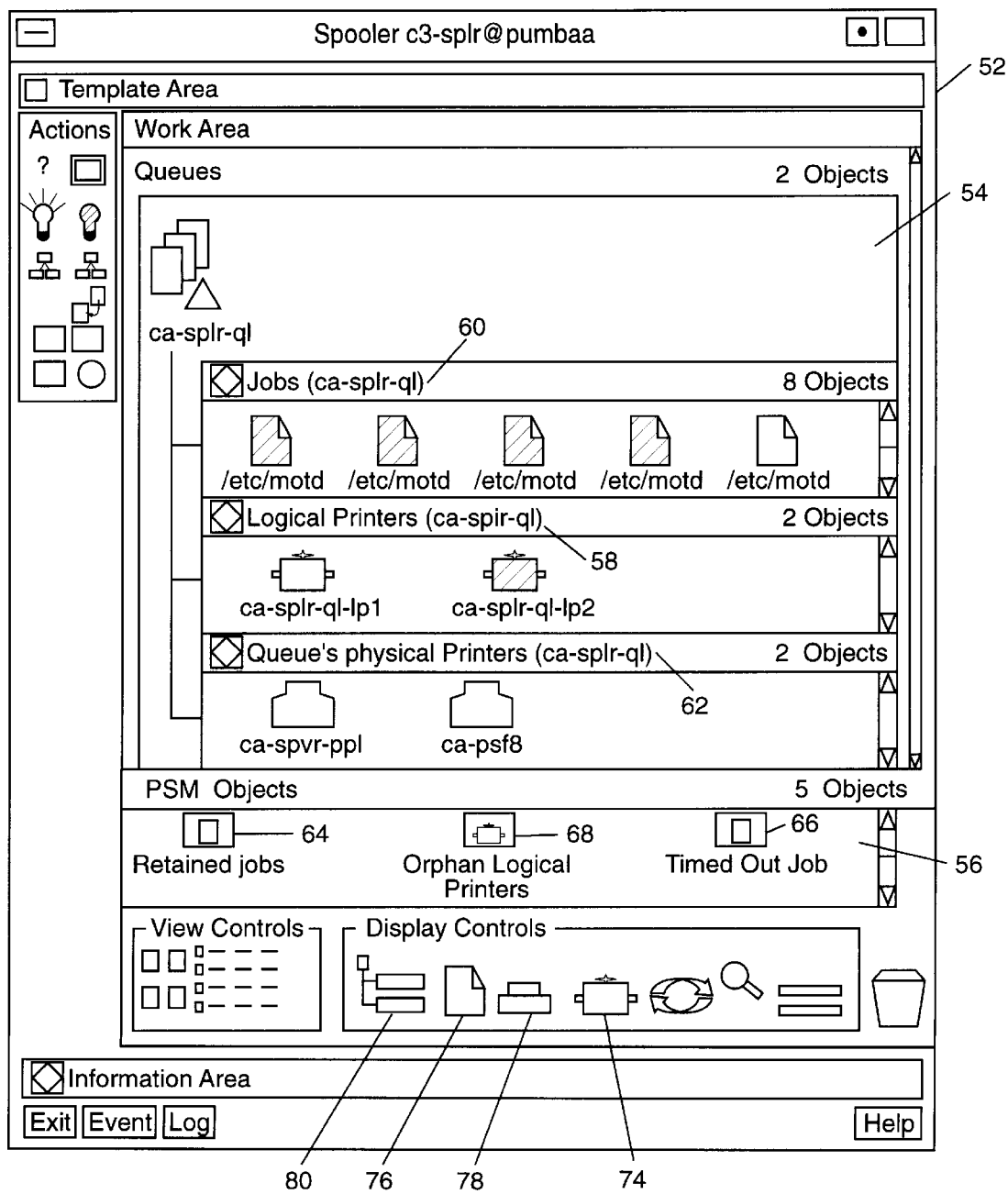
FIG. 3 is a typical screen display showing the Expand to Wells function in accordance with one embodiment of the present invention.

Referring now to FIG. 3, a sample display screen 12C in accordance with one embodiment of the present invention is portrayed. Window 52 portrays two panes, 54 and 56. Pane 54 is labeled "Queues." Pane 56 is labeled "PSM Objects." For a queue, one well can be opened for each of the following objects: logical printers 58, jobs 60, and physical printers 62. Pane 56 contains a Retained Jobs folder 64 and a Timed Out Jobs Folder 66 and an Orphan Logical Printers folder 68. One well can be opened for each of the following objects for a Retained Jobs folder 64: Retained Job. For a Timed Out jobs folder 66, a well can be opened called "Timed Out job". For an Orphan Logical Printers folder 68, a well can be opened called "Orphan Logical Printer". Along the bottom of window 52 are the various "Expand to" display control functions 74, 76, 78, and 80 that apply to the objects in Window 52. The Expand to display control functions are Expand to logical printers 74, Expand to jobs 76, Expand to physical printers 78, and Expand to wells 80.

If the Expand to logical printers display control 74 is selected and is dropped in a queue, a logical printers well opens containing logical printers. If Expand to physical printers display control 78 is selected and is dropped onto a queue, a physical printers well opens containing physical printers. If an Expand to jobs display control 76 is selected and dropped onto a queue, a jobs well is opened containing jobs. If an Expand to Wells display control 80 is selected and dropped onto a queue, then all three wells open, namely wells containing logical printers, physical printers, and jobs.

Selecting the Expand to Wells display control 80 and dropping it onto the Retained Jobs folder 64 opens a retained jobs well containing retained jobs. Selecting the Expand to Wells display control 80 onto the Timed Out Jobs folder 66 opens a timed out jobs well containing timed out jobs. Selecting the Expand to Wells display control 80 and dropping it onto the Orphan Logical Printers folder 68 opens an orphan logical printers well containing orphan logical printers.

Thus, to open all wells for a particular object, the user must drop only the Expand to Wells display control 80 onto the object. A specify "Expand to" display control, such as 74, 76, or 78 is not needed.

Figure 4A:
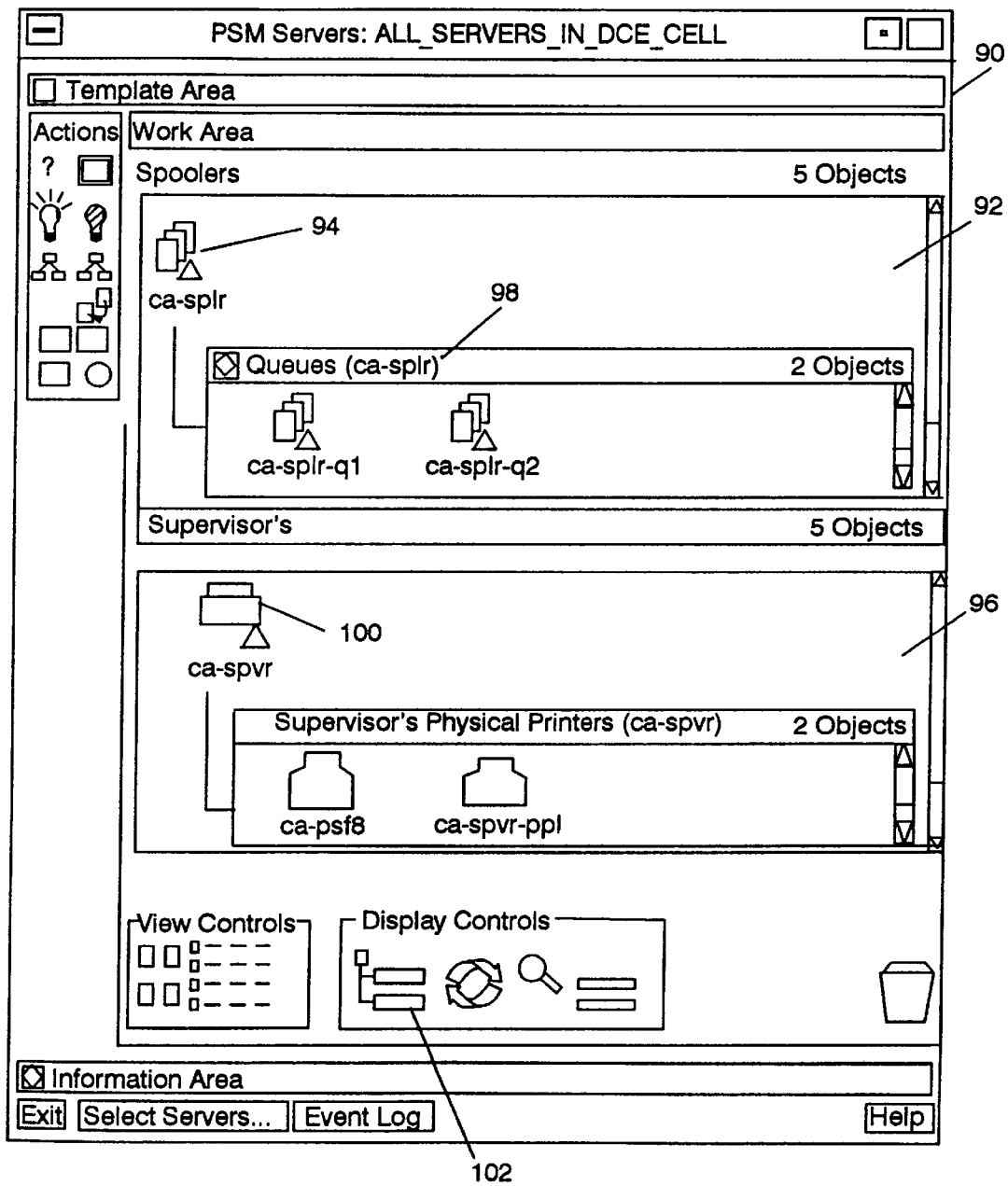
FIG. 4A is a typical screen display illustrating the Expand to Wells function of a second embodiment of the present invention.

FIG. 4A shows an alternative embodiment of the present invention. Window 90 portrays two panes, 92 and 94. Pane 92 contains spooler objects 94. A queues well 98 can be opened from spooler object 94. A physical printers well 100 can be opened from supervisors object 96. On the bottom of window 90 is an Expand to Wells function 102 in accordance with the present invention.

Figure 4B:
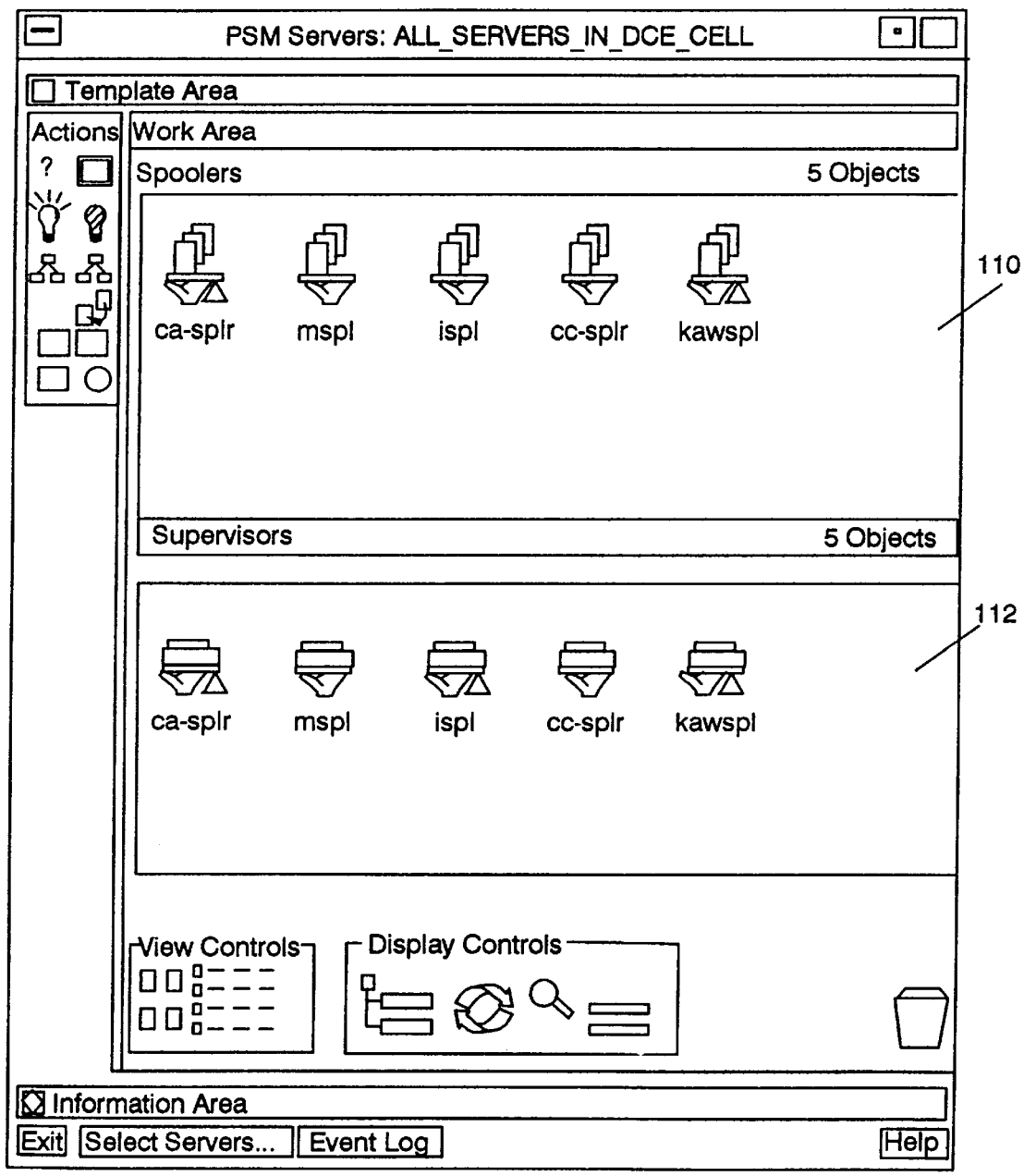
FIG. 4B is a typical screen display showing the resutl obtained by expanding the wells from FIG. 4A.

As shown in FIG. 4B, if the Expand to Wells function 102 is selected, dragged, and dropped on spooler object 94, a queues well 110 is displayed. Alternatively, if the Expand to Wells function 102 is selected, dragged, and dropped on the supervisors object 96, then a physical printers well 112 is displayed. The Expand to Wells function 102 opens all of the wells related to the object on which it is dropped. If the target object has no wells (i.e., no related objects), then the Expand to Wells function 102 cannot be dropped on the object.

FIG. 4 has only one "Expand to" display control. More than one "Expand to" display control is not needed since each of the objects 94 and 96 have only one associated well. If there is more than one well for a particular object, then a specific "Expand to" display control can be used for each well. In addition, an "Expand to Wells" display control can be used to open all of the wells for that object.

Figure 5A:
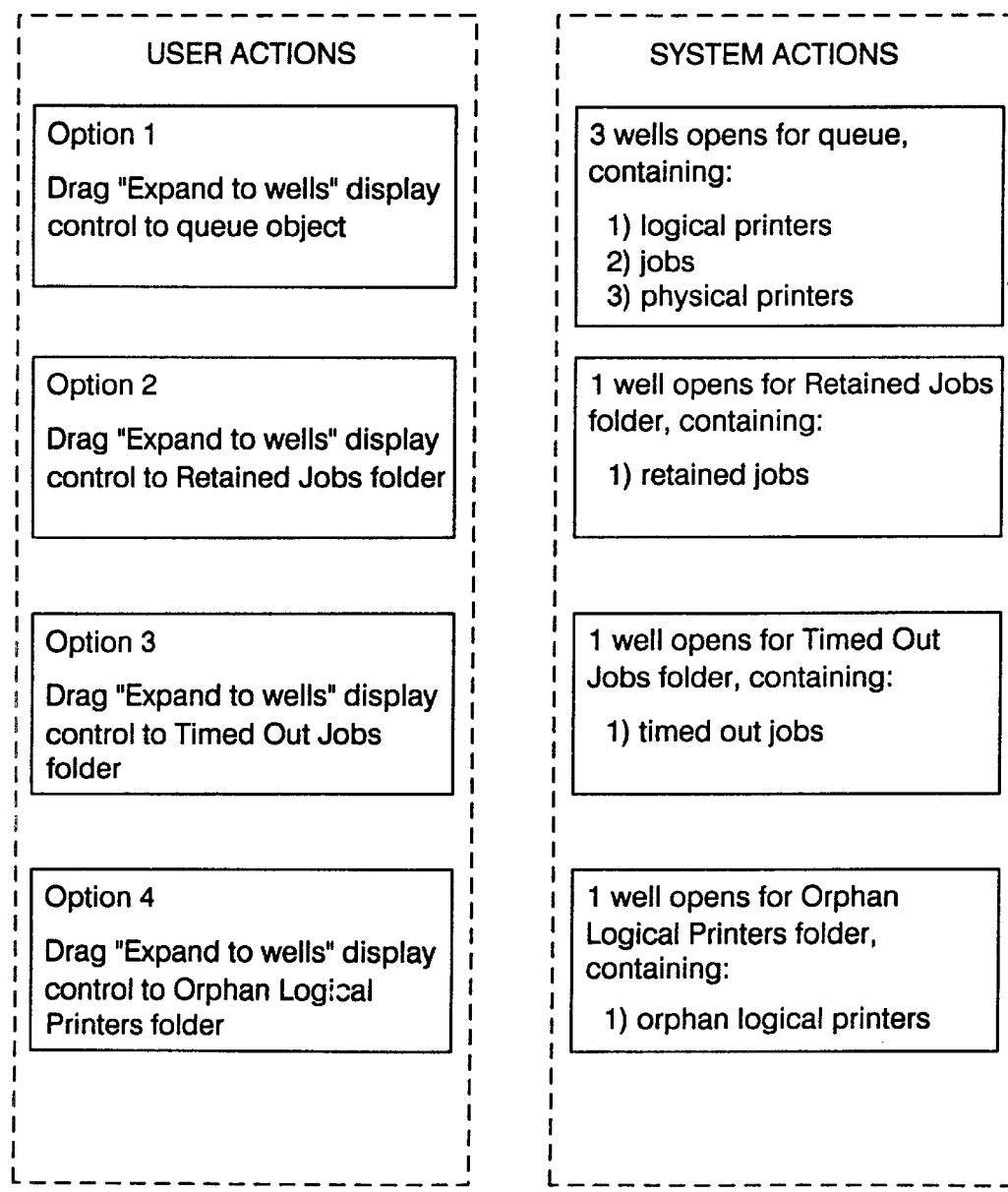
FIG. 5A and FIG. 5B, is a flow chart showing the method of the present invention.
Figure 5B:
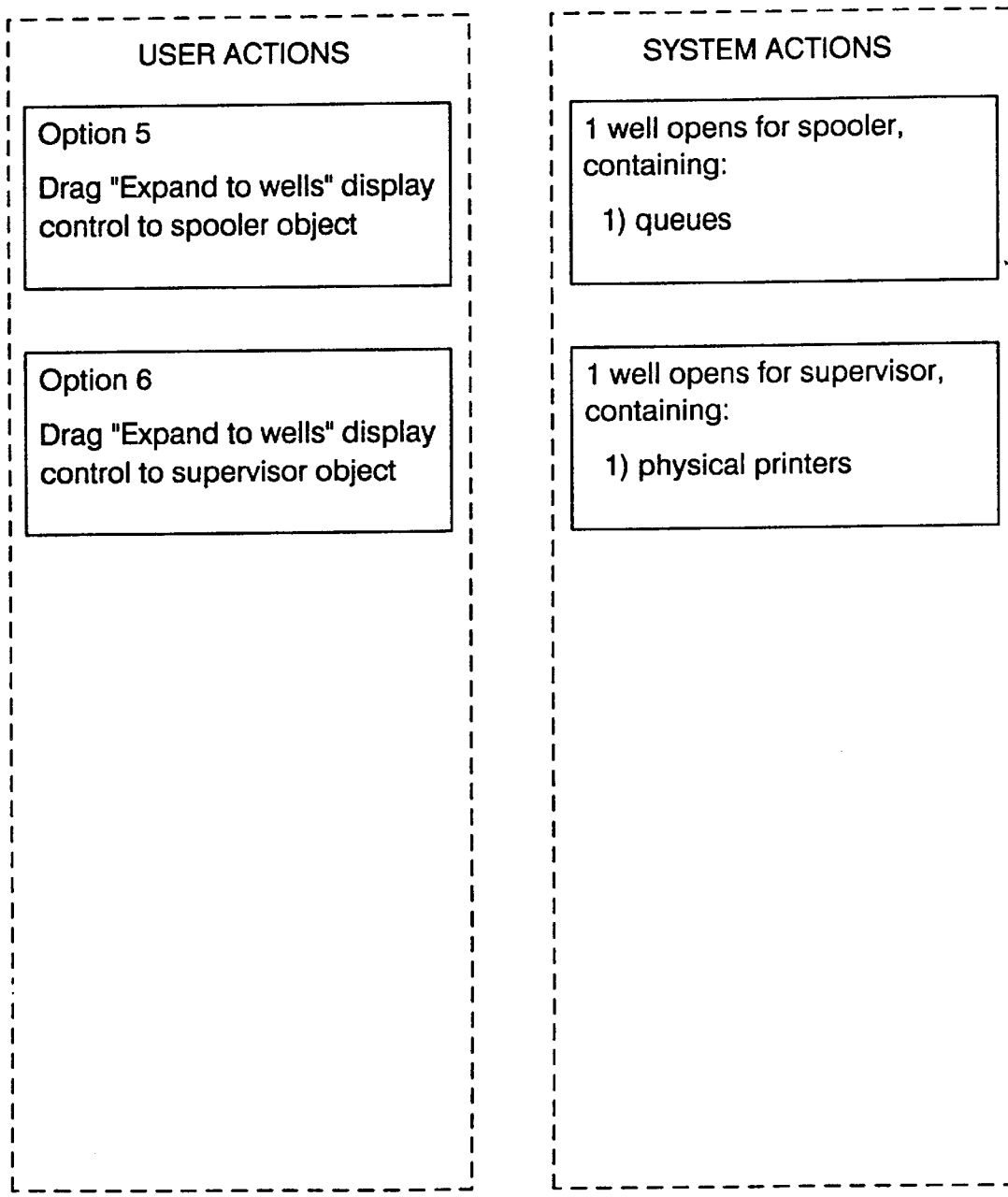

FIG. 5 is a flow chart demonstrating the method of the present invention.

Although the invention has been described with a certain degree of particularity, it should be recognized that elements thereof may be altered by person(s) skilled in the art with out departing from the spirit and scope of the invention. The invention is limited only by the following claims and their equivalents.

What is claimed is:

1. A system for viewing related objects associated with target objects, wherein each target object includes related objects, as controlled by a computer system having at least a visual operator interface, an operating system for controlling the operation of program applications within the computer system, and memory for storing a program application, the system comprising:

means for displaying a first window of at least one target object, wherein a target object includes related objects that are members of a first and second classes of related objects, wherein the related objects associated with the first class have different properties than the related objects associated with the second class;

means for graphically dragging and dropping one of a first and second display control functions to the target object, wherein the first display control function is associated with the first class of related objects and the second display control function is associated with the second class of related objects, and wherein the first and second display control functions are capable of being applied to a plurality of the target objects; and means for displaying a second window displaying the related objects for the target object to which one of the first and second display control functions was applied that are members of the class of objects associated with the applied display control function in response to applying the display control function to the target object.

2. The system of claim 1, further comprising:

means for inhibiting the display of the second window if there are no related objects that are members of the class associated with the applied display control function.

3. The system of claim 1, wherein the means for displaying a second window displays a separate window of related objects for each target object into which the display control function was applied.

4. The system of claim 1, wherein the display control function includes means for displaying a class of queued job task related objects for a target object, wherein at least one of the target objects includes related objects comprised of queued job tasks waiting to be processed by the program application, wherein the means for displaying the second window includes means for displaying graphical representations of the queued job task related objects for the target objects to which the display control function is applied.

5. The system of claim 1, wherein the program application is a printing program, wherein the display control function includes means for displaying a class of printer related objects for a target object, wherein at least one of the target objects includes related objects comprised of printer devices to which print jobs controlled by the printer program are sent, wherein the means for displaying the second window includes means for displaying graphical representations of the printer related objects in the target objects to which the display control function is applied.

6. The system of claim 1, wherein the means for applying a display control function further comprises a third display control function associated with both the first and second classes, and wherein the means for displaying a second window further comprises means for displaying in the second window the related objects that are members of the first and second classes and not any other separate classes in response to the application of the third display control function to the target object, wherein the third display control functions is capable of being applied to a plurality of the target objects.

7. The system of claim 1, wherein related objects in the first class comprise print jobs and the related objects in the second class comprise printer queues, wherein the means for displaying the second window comprises means for displaying print jobs in response to the application of the first display control function and displaying printer queues in response to the application of the second display control function to the target object.

8. The system of claim 7, wherein the second class of related objects comprise logical printer queues and a third class of related objects comprise physical printer queues, wherein the means for applying the display control function further comprises means for applying a third display control function to one of the target objects, wherein the third display control function is associated with the third class, wherein the means for displaying the second window further comprises means for displaying logical printer queues associated with the target object in response to the application of the second display control function to the target object and displaying physical printer queues associated with the target object in response to the application of the third display control function to the target object.

9. A method for viewing related objects associated with target objects, wherein each target object includes related objects, as controlled by a computer system having at least a visual operator or interface, an operating system for controlling the operation of program applications within the computer system, and memory for storing a program application, the method comprising the steps of:

displaying a first window of at least one target object, wherein a target object includes related objects that are members of a first and second classes of related objects, wherein the related objects associated with the first class have different properties than the related objects associated with the second class;

graphically dragging and dropping one of a first and second display control functions to the target object, wherein the first display control function is associated with the first class of related objects and the second display control function is associated with the second class of related objects, and wherein the first and second display control functions are capable of being applied to a plurality of the target objects; and displaying a second window displaying the related objects for the target object to which one of the first and second display control functions was applied that are members of the class of objects associated with the applied display control function in response to applying the display control function to the target object.

10. The method of claim 9, further comprising:
inhibiting the display of the second window if there are no related objects that are members of the class associated with the applied display control function.

11. The method of claim 9, wherein the step of displaying a second window comprises displaying a separate window of related objects for each target object into which the display control function was applied.

12. The method of claim 9, wherein the display control function relates to a class of queued job tasks, wherein at least one of the target objects includes related objects comprised of queued job tasks waiting to be processed by the program application, wherein the step of displaying the second window comprises the step of displaying graphical representations of the queued job task related objects for the target objects to which the display control function is applied.

13. The method of claim 9, wherein the program application is a printing program, wherein at least one of the target objects includes related objects comprised of printer devices to which print jobs controlled by the printer program are sent, and wherein the step of displaying the second window comprises displaying graphical representations of the printer related objects in the target objects to which the display control function is applied.

14. The method of claim 9, wherein the step of applying a display control function further comprises a third display control function associated with both the first and second classes, and wherein the step of displaying a second window further comprises the step of displaying in the second window the related objects that are members of the first and second classes and not any other separate classes in response to the application of the third display control function to the target object wherein the third display control functions is capable of being applied to a plurality of the target objects.

15. The method of claim 9, wherein related objects in the first class comprises print jobs and the related objects in the second class comprise printer queues, wherein the means for displaying the second window comprises means for displaying print jobs in response to the application of the first display control function and displaying printer queues in response to the application of the second display control function to the target object.

16. The method of claim 15, wherein the second class of related objects comprise logical printer queues and a third class of related objects comprise physical printer queues, wherein the step of applying the display control function further comprises the step of applying a third display control function to one of the target objects, wherein the third display control function is associated with the third class, wherein the steps of displaying the second window further comprises the step of displaying logical printer queues associated with the target object in response to the application of the second display control function to the target object and displaying physical printer queues associated with the target object in response to the application of the third display control function to the target object.

17. An article of manufacture for use in programming an application program to view on a display monitor related objects associated with a target object, wherein each target object includes related objects, the article of manufacture comprising at least one computer readable storage device including at least one computer program embedded therein that causes the application program to perform the steps of:

displaying a first window of at least one target object, wherein a target object includes related objects that are members of a first and second classes of related objects, wherein the related objects associated with the first class have different properties than the related objects associated with the second class;

graphically dragging and dropping one of a first and second display control functions to the target object, wherein the first display control function is associated with the first class of related objects and the second display control function is associated with the second class of related objects, and wherein the first and second display control functions are capable of being applied to a plurality of the target objects; and displaying a second window displaying the related objects for the target object to which one of the first and second display control functions was applied that are members of the class of objects associated with the applied display control function in response to applying the display control function to the target object.

18. The article of manufacture of claim 17, wherein the step of displaying a second window comprises displaying a separate window of related objects for each target object into which the display control function was applied.

19. The article of manufacture of claim 17, wherein the display control function relates to a class of queued job tasks, wherein at least one of the target objects includes related objects comprised of queued job tasks waiting to be processed by the program application, wherein the step of displaying the second window comprises the step of displaying graphical representations of the queued job task related objects for the target objects to which the display control function is applied.

20. The article of manufacture of claim 17, wherein the program application is a printing program, wherein at least one of the target objects includes related objects comprised of printer devices to which print jobs controlled by the printer program are sent, and wherein the step of displaying the second window comprises displaying graphical representations of the printer related objects in the target objects to which the display control function is applied.

21. The article of manufacture of claim 17, wherein the step of applying a display control function further comprises a third display control function associated with both the first and second classes, and wherein the step of displaying a second window further comprises the step of displaying in the second window the related objects that are members of the first and second classes and not any other separate classes in response to the application of the third display control function to the target object wherein the third display control functions is capable of being applied to a plurality of the target objects.

22. The article of manufacture of claim 17, wherein related objects in the first class comprises print jobs and the related objects in the second class comprise printer queues, wherein the means for displaying the second window comprises means for displaying print jobs in response to the application of the first display control function and displaying printer queues in response to the application of the second display control function to the target object.

23. The article of manufacture of claim 22, wherein the second class of related objects comprise logical printer queues and a third class of related objects comprise physical printer queues, wherein the step of applying the display control function further comprises the step of applying a third display control function to one of the target objects, wherein the third display control function is associated with the third class, wherein the step of displaying the second window comprises the steps of displaying logical printer queues associated with the target object in response to the application of the second display control function to the target object and displaying physical printer queues associated with the target object in response to the application of the third display control function to the target object.

24. A system for viewing related objects associated with target objects as controlled by a computer system having at least a visual operator interface, an operating system for controlling the operation of program applications within the computer system, and memory for storing a program application, the system comprising:

means for displaying a first window of related objects associated with one of a plurality of target objects, wherein each target object is capable of including related objects, wherein each related object comprises one of a print job, logical printer queue, and physical printer queue;

means for applying one of a first, second, and third display control functions to one of the target objects, wherein the first display control function is associated with the print jobs, the second display control function is associated with the logical printer queues, and the third display control function is associated with the physical printer queues, and wherein the first and second display control functions are capable of being applied to a plurality of the target objects; and means for displaying a second window displaying the related objects for the target object to which one of the display control functions was applied that are one of print jobs in response to the application of the first display control function to the target object, physical printer queues in response to the application of the second display control function to the target object, and logical printer queues in response to the application of the third display control function to the target object.

25. A method for viewing related objects associated with target objects as controlled by a computer system having at least a visual operator interface, an operating system for controlling the operation of program applications within the computer system, and memory for storing a program application, the method comprising the steps of:

displaying a first window of related objects associated with one of a plurality of target objects, wherein each target object is capable of including related objects, wherein each related object comprises one of a print job, logical printer queue, and physical printer queue;

applying one of a first, second, and third display control functions to one of the target objects, wherein the first display control function is associated with the print jobs, the second display control function is associated with the logical printer queues, and the third display control function is associated with the physical printer queues, and wherein the first and second display control functions are capable of being applied to a plurality of the target objects; and displaying a second window displaying the related objects for the target object to which one of the display control functions was applied that are one of print jobs in response to the application of the first display control function to the target object, physical printer queues in response to the application of the second display control function to the target object, and logical printer queues in response to the application of the third display control function to the target object.

26. An article of manufacture for use in programming an application program to view on a display monitor related objects associated with a target object, the article of manufacture comprising at least one computer readable storage device including at least one computer program embedded therein that causes the application program to perform the steps of:

displaying a first window of related objects associated with one of a plurality of target objects, wherein each target object is capable of including related objects, wherein each related object comprises one of a print job, logical printer queue, and physical printer queue;

applying one of a first, second, and third display control functions to one of the target objects, wherein the first display control function is associated with the print jobs, the second display control function is associated with the logical printer queues, and the third display control function is associated with the physical printer queues, and wherein the first and second display control functions are capable of being applied to a plurality of the target objects; and displaying a second window displaying the related objects for the target object to which one of the display control functions was applied that are one of print jobs in response to the application of the first display control function to the target object, physical printer queues in response to the application of the second display control function to the target object, and logical printer queues in response to the application of the third display control function to the target object.

* * * * *

UNITED STATES PATENT AND TRADEMARK OFFICE
CERTIFICATE OF CORRECTION

PATENT NO. : 6,054,988
DATED : April 25, 2000
INVENTOR(S) : Alimpich et al.

It is certified that error appears in the above-identified patent and that said Letters Patent is hereby corrected as shown below:

Column 8,
Line 18, please delete "claim 9" and insert -- claim 1 --

Signed and Sealed this

Fifteenth Day of June, 2004

JON W. DUDAS
*Acting Director of the United States Patent and Trademark Office*